Feb. 17, 1970   A. C. W. CALVER   3,496,398
COMMUTATORS
Filed March 20, 1967   3 Sheets-Sheet 3

United States Patent Office 3,496,398
Patented Feb. 17, 1970

3,496,398
COMMUTATORS
Arthur Colin William Calver, Benoni, Transvaal, Republic of South Africa, assignor to Federal Motor Parts Corporation (Proprietary) Limited, Johannesburg, Transvaal, Republic of South Africa
Filed Mar. 20, 1967, Ser. No. 624,402
Claims priority, application Republic of South Africa, Mar. 22, 1966, 66/1,624
Int. Cl. H01r 39/04
U.S. Cl. 310—236                        4 Claims

ABSTRACT OF THE DISCLOSURE

This invention comprises a commutator device in which a body is formed of suitable insulating synthetic resinous material, preferably divided into a series of axially spaced members, and the periphery of the body is equipped with axially extending slots into which the conductor bars are moved with a sliding action. The bars when in position are prevented from moving radially free of the body members by virtue of the section of the slots employed. The bars at one end of the commutator overhang the body to provide a recess into which armature winding ends may be pushed to effect a couple between the commutator and associated armature.

---

This invention relates to commutators for electric motors and generators.

Commutators which are used today suffer from various drawbacks. Common drawbacks are involved in manufacturing processes and difficult repair techniques. One reason for this is that the conducting bars on commutators all require to be insulated from each other and from the rotational shaft. A further reason is that often high peripheral speeds are required thereby requiring the individual elements to be located firmly in position.

The basic requirements of a known commutator are, firstly, a sleeve for location on the armature shaft, secondly, an insulating covering for the sleeve and, thirdly, a series of circumferentially spaced conducting bars around the periphery of the sleeve for contact with the brushes. The bars must also be insulated from each other.

In the preparation of one form of commutator falling within the type described above, the sleeve and the conductors are located in jig means preparatory to the location of Bakelite powder in the space between the elements. The Bakelite is then fused and allowed to set. When this material has set the jig means may be removed. To enhance the bond between all the elements in the commutator, special ridges, feet, projections and the like are provided on the bars and sleeve periphery about which the Bakelite is caused to set.

A further form of commutator of the kind in question includes conducting bars each of which is of dovetail-section, the shaft of each dovetail being squat and having sides which slope inwardly in a radial sense. The bars are located circumferentially about a soft metal sleeve with a mica layer insulating the bars from the sleeve. Each end of the cylindrical space defined between the bars and sleeve is closed with an insulated ring which is crimped in position by a belling of the sleeve at its ends. The rings are shaped to lay against the sloping sides of the shafts of the bars firmly to hold the latter in position and an effective bond is established between the rings, sleeve, and bars.

It will be clear from the above description that the technique involved in the production of the known commutators is by no means simple and an object of the present invention is to provide a method of a more simple character; embodying design features which allow cooling, expansion and bar shapes permitting better commutation.

A method of manufacturing a commutator includes the steps of providing at least one cylindrical member of suitable insulating material, forming a plurality of substantially axially disposed slots in the peripheral zone of the member, locating elongated conducting elements in the slots and anchoring the elements in position.

Further according to the invention the peripheral region of the cylindrical member is slotted axially to receive the conducting elements which are moved into position with a sliding action, the conductors and slots being of complementary section and the section chosen being such as to prevent radially outward movement of the conductors. Preferably the conductors are locked in position by a deformation process applied to at least one end of the conductors.

In a preferred arrangement of the invention a plurality of cylindrical members is employed, the members being arranged in axial relationship along the length of the commutator.

Also in a preferred form of the invention a series of ventilating channels is provided in the cylindrical members such that when they are arranged in axial relationship the members collectively define ventilating channels in both radial and axial directions. Preferably the radial and axial ventilating channels are brought into communication.

The cylindrical member may be bored centrally to receive a shaft end, the bore preferably being lined with a suitable sleeve.

In a further preferred form of the invention the conducting elements may project beyond the end of the cylindrical member to provide an end recess through which the shaft is allowed to project from the bore in the cylindrical member. The end recess, preferably, provides a location for the conductors constituting the windings of an armature with which the commutator is associated, the armature winding ends located in the recess being held supported against radially inwardly directed bending forces by a ring of suitably insulated material. This is necessary because the contact between the armature conductors and the commutator conducting elements is a forced one, achieved by wedging the armature conductors underneath the conductor elements of the commutator.

In the preferred form of the invention a locking ring may be passed over the cylindrical member and the conducting elements thereby effectively to couple the conducting elements to associated armature winding ends.

In order to illustrate the invention two examples are described hereunder with reference to the accompanying drawings in which.

Figure 1:
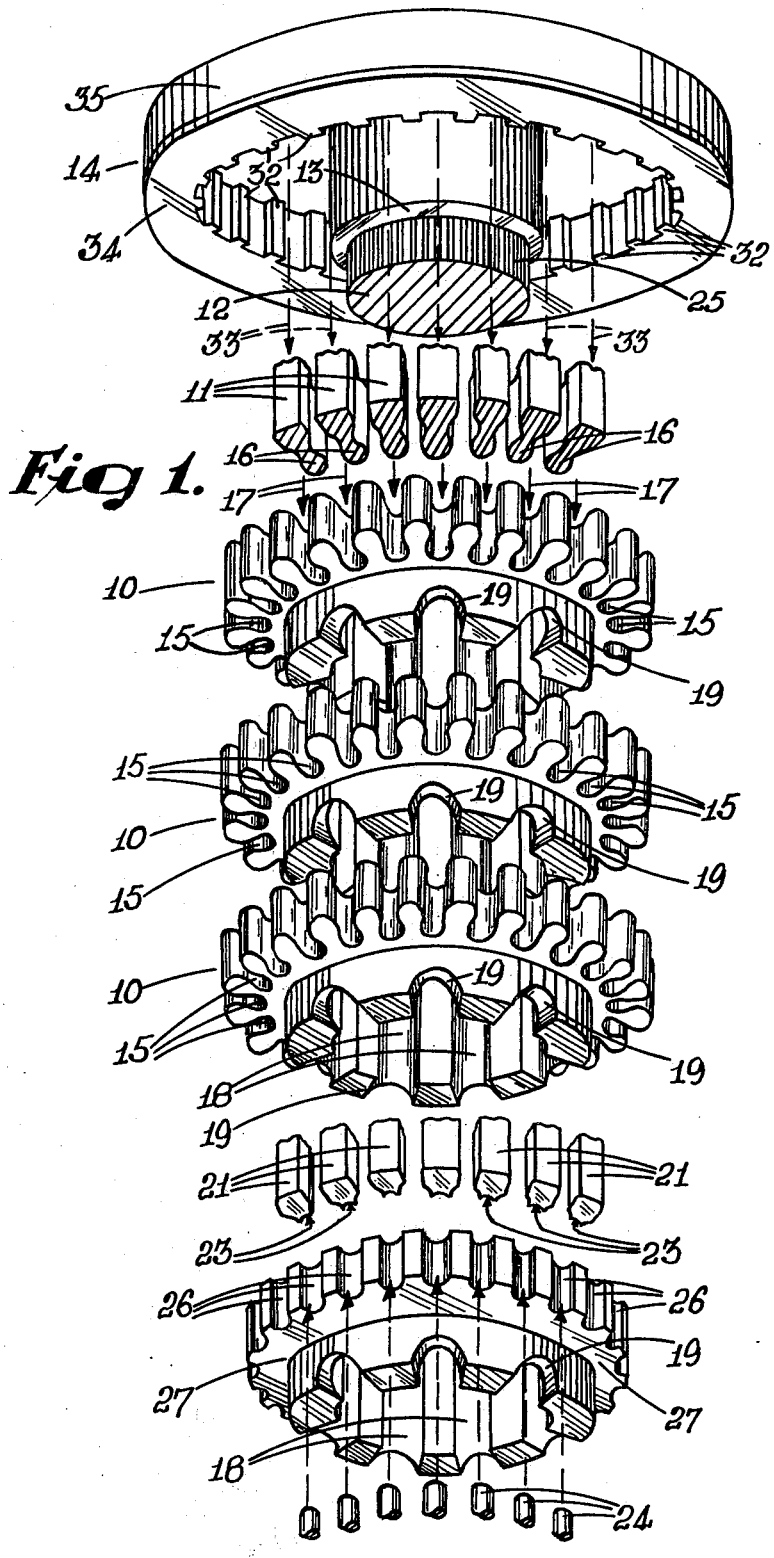
FIGURE 1 is an exploded view showing the development of one form of commutator according to the invention.
Figure 2:
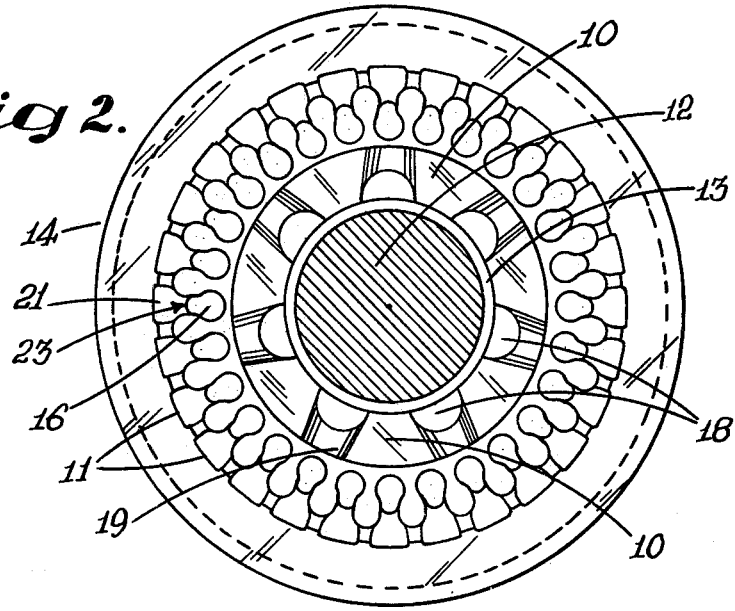
FIGURE 2 is an end view of the commutator looking towards an armature associated with the commutator.
Figure 3:
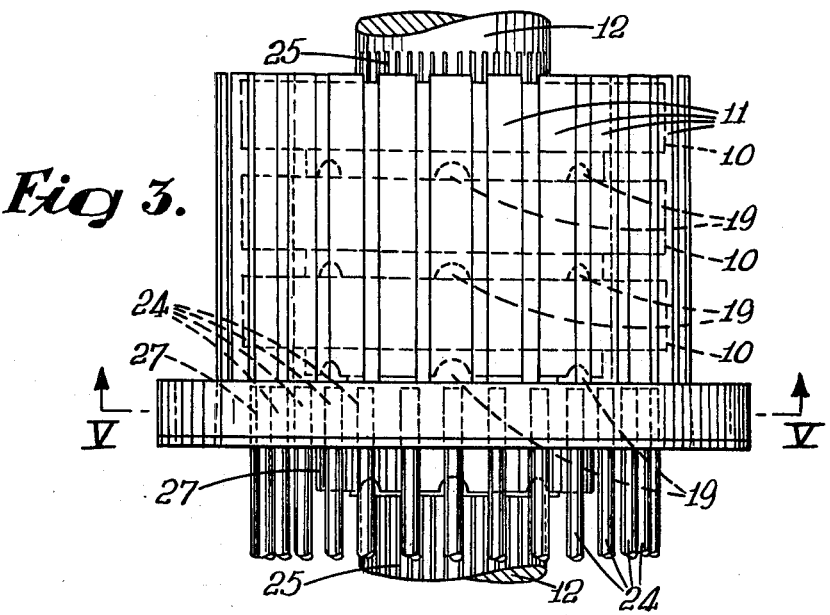
FIGURE 3 is a plan view of the commutator with the terminal portion of the armature clamped in position.
Figure 4:
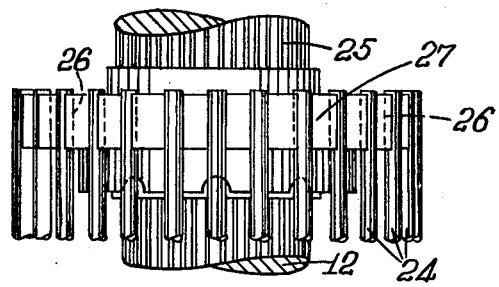
FIGURE 4 is a terminal portion of an armature ready for coupling to the commutator.
Figure 5:
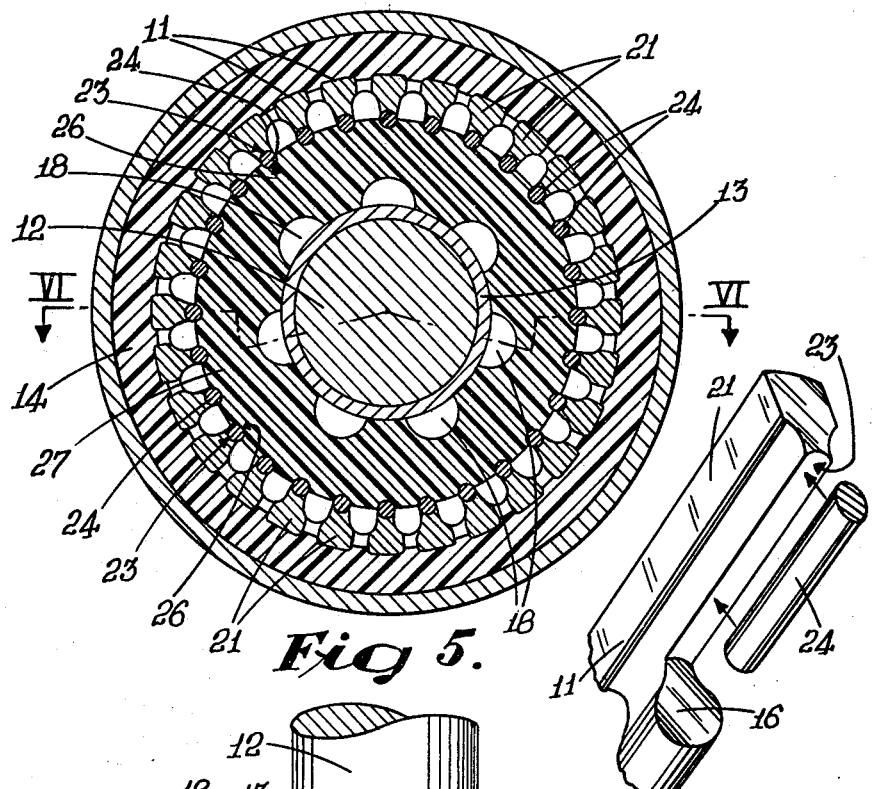
FIGURE 5 is a sectional end elevation of the commutator on the line V—V of FIGURE 3.
Figure 7:
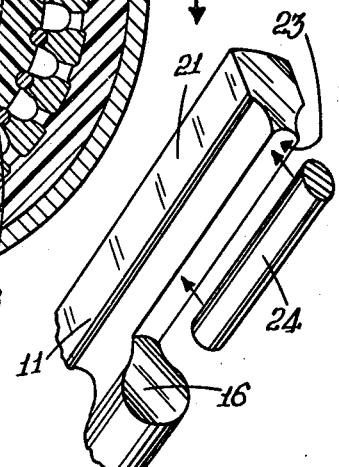
FIGURE 7 is a fragmentary perspective view of the engagement between an armature winding end and the associated end of a commutator conducting bar.

Referring to FIGURES 1 to 7, the commutator includes cylindrical foundation members 10 made from suitable insulating synthetic resinous material, elongated conductor bars or elements 11, a shaft 12 on which the members 10 are to be mounted, a sleeve 13 for location between the members 10 and the shaft 12, and a locking ring or sleeve 14.

In the arrangement under consideration the members 10 are bored centrally and their peripheries are characterised in a series of axially disposed slots 15 which are used to anchor the conducting bars 11 in position on the commutator. The slots are of pear-shaped section to mate with the base zone 16 of the conductor bars. The bars are urged into position in the slots by a sliding action in the direction of arrows 17 and preferably a slight deformation is effected at an end of each conductor to ensure its permanent location on the commutator. Radial separation is prevented because of the form of section of the slots and conductors.

Figure 6:
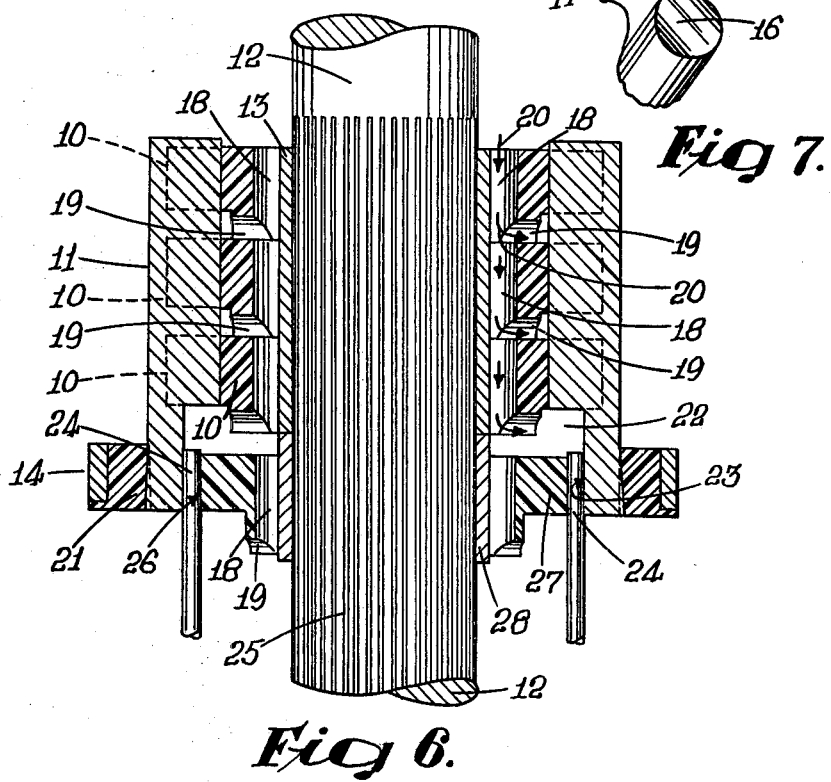
FIGURE 6 is a sectional plan of the commutator on the line VI—VI of FIGURE 5.

For ventilating purposes the members 10 collectively define ventilating ducts 18 an axial direction and intercommunicating radial ducts 19. FIGURE 6 clearly illustrates the type of ventilation paths provided when the members 10 are located in abutting relationship. Because of the rotation of the commutator, air entering along the axial ducts 18 will be urged radially outwardly through centrifugal force, or as shown by arrows 20.

In the preferred examples of the invention the commutator is formed with the ends 21 of the bars 11 projecting beyond the neighbouring member 10 to provide a recess 22, the purpose of which will be discussed at a later stage.

The projecting portions of the conductor bars 11 are undercut as shown by reference 23 and the undercut zone of each bar is adapted to mate with an associated armature winding end 24.

The completed commutator then includes the series of members 10 mounted in abutment on sleeve 13 and the sleeve in turn is anchored above shaft 12. Preferably shaft 12 is serrated as shown by reference 25 and the commutator is force fitted over the sleeve 13.

In this example the shaft is preferably part of an armature and the commutator is mounted over a projecting portion of the armature shaft around which are located the armature winding ends. These ends are shown by reference 24 and are directed towards the recess 22 defined at tht relevant end of the commutator.

Ends 24 of the armature windings are located in spaced relationship in slots 26 defined around the periphery of support ring 27 which in turn is force fitted over shaft 12. FIGURE 6 shows this aspect clearly and in addition shows how the ring 27 is also mounted on the sleeve 28. Ring 27 is adapted to be accommodated within recess 22 and its purpose is to hold the armature winding ends stably in position against the associated ends 21 of the conductor bars 11.

A good electrical connection may be established between the commutator bars and the armature winding ends by flaring outwardly the ends 21 of the bars 11 and providing a slightly oversize diameter for the nest of ends 24 which pass into the recess. The locking ring 14 is then passed axially along the commutator towards the recess end and by the application of adequate force the ring may be caused to urge the ends 21 of bars 11 radially inwardly to effect the required connection. A general wedging action is desirable.

References 24 and 30 show only a single conductor connected to each commutator bar 11; however, this should be considered as illustrative of perhaps more than a single armature conductor being connected to each commutator bar 11, as the machine design requires. Should more than a single conductor 24 be connected to each bar 11 in the first example of the commutator of the invention then slots 26 of the ring 27 may be made deeper to accommodate the further conductors. In the second example of the commutator of the invention the slots 31 may be made deeper to accommodate further conductors.

The bore of the locking ring 14 is provided with teeth 32 for location between the commutator bars 11, the teeth assisting the wedging connection between tht armature conductors and associated commutator bars and ensuring the spacing between the commutator bars is maintained. Arrows 33 indicate the location of the locking ring 14 on the commutator bars 11.

The portion 34 of the locking ring 14 abutting the commutator bars 11 is made of a suitable synthetic material which is insulating and it may be provided around its outer circumference with a metal reinforcing ring 35.

Tests have shown that a glass-fibred nylon compound is a suitable material from which to form the members 10 and the portion 34 of ring 14.

The provision of ventilating channels in the foundation members 10 which run through the commutator body itself as illustrated by references 18 and 19 is a feature which greatly improves the efficiency of commutation. By these ventilating channels, cooling air is axially drawn into the commutator body and expelled radially under centrifugal forces between each conductor element at several places along their length. Tests conducted with commutators of the invention have shown the commutators to run at a lower temperature than known commutators, and this results in a higher commutating efficiency.

The cool running of the commutators of the invention eliminates a further difficulty which arises with the Bakelite commutators as mentioned above. In the latter commutators, as the commutator body heats up the Bakelite and copper conductors heat up accordingly, and because these two materials have different coefficients of expansion this often leads to cracking of the Bakelite with the possibility of subsequent harm to the commutator. For instance the possibility arise of the commutator bars working loose from the commutator body. In several forms of the commutator of the invention, as heating is restricted to a minimum this difficulty with different coefficients of expansion of materials does not arise. Any increase of temperature which might arise can however be absorbed in the conductor elements which are free to expand lengthwise.

An advantage of at least some of the commutators of the invention is that they do not require solder to be used as a means of cementing the armature zones to the commutators bars. This is particularly true of commutators made in accordance with the first example of the invention. By employing a locking ring with either of the two examples of commutator illustrated the time consuming tasks of soldering each associated armature conductor to the relevent commutator conductor is eliminated.

It should, however, be understood that the scope of the invention should not be considered to exclude the soldering operation of the armature conductors to the commutator bars. This might still be a requirement in the commutator of the second example of the invention where slots 31 may be filled with solder around the conductor 30 and further in certain high current machines.

In high current machines it might also be a requirement that the outer peripheries of the body members terminate flush with the tops of the conductor elements. This would provide a greater degree of insulation between the commutator bars and would prevent sparking between commutator bars at the point of current take off by the brushes.

In low current machines, for example generators used in automobiles, the termination of the peripheries of the body members below the conductor elements will eliminate the time consuming and often tedious undercutting operation enabling a smoother finish and better shape to be maintained between the axial slots, thus promoting improved commutation.

With the commutators of the invention a completely symmetrically balanced unit may be obtained. Accordingly during rotation there is no jumping of the brushes on the commutator bars, an occurrence which might arise in known commutators, with the result that this also improves the efficiency of commutation.

Many more examples of the invention exist each differing from the other in matters of detail only but in no way departing from the scope of the invention. For instance the commutator conductors may be of any desirable shape consistent with the requirement of being able to anchor themselves against radially outward movement.

Relative to known commutators mentioned above which employ dovetail copper sections to secure the commutator bars against radial outward expansion, the commutators have no requirement of this extra copper and accordingly the resultant commutator is less expensive to produce.

It may readily be seen, therefore, that the arrangement of the invention dispenses entirely with the moulding step which is a feature of known commutators using Bakelite as a means of bonding the conductors to the commutator body. Assembly of the commutator is now simply a matter of inserting the conductor bars or elements into slots provided in an insulating body member, and suitably anchoring the bars in the slots.

I claim:

1. A commutator including at least one cylindrical member of insulating material and provided with a plurality of substantially axially disposed slots in the peripheral zone thereof, elongated conducting elements having a cross-sectional portion which is substantially complementary to the slot cross-section, said elements being slidingly engageable in the slots substantially along the length of each element in such manner as to prevent radial outward separation from the commutator, and axial and radial ventilating channels being provided in the member.

2. The commutator claimed in claim 1 comprising a series of cylindrical members in axial relationship with the first said cylindrical member, the members collectively being positioned substantially along the length of each element and collectively defining inter-communicating axial and radial ventilation channels through the commutator.

3. The commutator claimed in claim 2 in which the conducting elements project at one end of the commutator to define recesses on the inwardly directed face of the elements comprising armature windings including ends housed in the recesses.

4. The commutator claimed in claim 3 comprising a locking ring located over the conducting elements adjacent the recesses to maintain the spacing thereof and to urge the elements towards the associated armature winding ends, the elements being supported on a cylindrical member axially located relative to the commutator members.

References Cited

UNITED STATES PATENTS

| | | | |
|---|---|---|---|
| 1,875,203 | 8/1932 | Apple | 310—236 X |
| 3,079,520 | 2/1963 | Schafer et al. | 310—235 |
| 3,146,364 | 8/1964 | Paul | 310—236 |
| 2,915,658 | 12/1959 | Arnold | 310—234 |
| 2,353,336 | 7/1944 | Heintz et al. | 310—61 |

J D MILLER, Primary Examiner

G. P. TOLIN, Assistant Examiner

U.S. Cl. X.R.

310—60